(12) United States Patent
Chu et al.

(10) Patent No.: US 12,012,770 B2
(45) Date of Patent: Jun. 18, 2024

(54) CORE-PULLING TRANSFER DEVICE AND CONSTRUCTION METHOD FOR REVERSE DEMOLITION OF REINFORCED CONCRETE STRUCTURES

(71) Applicant: CABR Technology Co., Ltd., Beijing OT (CN)

(72) Inventors: Dewen Chu, Beijing (CN); Feng Liu, Beijing (CN); Jirui Shi, Beijing (CN); Hongrui Ma, Beijing (CN); Shuang Zhao, Beijing (CN)

(73) Assignee: CABR TECHNOLOGY CO., LTD., Beijing (CN)

( * ) Notice: Subject to any disclaimer, the term of this patent is extended or adjusted under 35 U.S.C. 154(b) by 469 days.

(21) Appl. No.: 17/350,020

(22) Filed: Jun. 17, 2021

(65) Prior Publication Data

US 2021/0310265 A1 Oct. 7, 2021

(30) Foreign Application Priority Data

Jul. 29, 2020 (CN) .......................... 202010743924.6

(51) Int. Cl.
| | |
|---|---|
| *E04G 23/00* | (2006.01) |
| *B66F 7/20* | (2006.01) |
| *E04G 23/06* | (2006.01) |
| *E04G 23/08* | (2006.01) |

(52) U.S. Cl.
CPC .............. *E04G 23/065* (2013.01); *B66F 7/20* (2013.01); *E04G 23/08* (2013.01)

(58) Field of Classification Search
CPC ....... E04G 23/06; E04G 23/065; E04G 23/08; E04G 23/081; B66F 7/16; B66F 7/18; B66F 7/20; B66F 9/00; B66F 9/04
See application file for complete search history.

(56) References Cited

U.S. PATENT DOCUMENTS

| | | | | |
|---|---|---|---|---|
| 4,108,583 A | * | 8/1978 | Ellen ....................... | E04G 17/16 425/65 |
| 4,156,999 A | * | 6/1979 | Avery ...................... | E04G 11/50 52/841 |
| 5,049,022 A | * | 9/1991 | Wilson .................... | E04H 6/186 414/253 |
| 5,567,867 A | * | 10/1996 | Nazar ...................... | G01M 7/08 173/90 |

(Continued)

*Primary Examiner* — Chi Q Nguyen
(74) *Attorney, Agent, or Firm* — IPRO, PLLC

(57) ABSTRACT

A core-pulling transfer device for reverse demolition of reinforced concrete structures comprises temporary supports, long-stroke hydraulic jacks and steel crossbeams. The temporary supports are supported on bottom surfaces of bottom crossbeams of the reinforced concrete structure, and a beam end through hole is formed in each end, connected with a force-transmitting structure column, of each bottom crossbeam. Two long-stroke hydraulic jacks are symmetrically arranged on both sides of each force-transmitting structure column. Core-pulling holes are formed in upper end sides of demolition floor structure columns. One steel crossbeam is in clearance fit with each core-pulling hole, and both ends of each steel crossbeam extend out of the corresponding core-pulling hole. The device can quickly carry out vertical load transfer of the reinforced concrete structure, smoothly transfer vertical force, and achieve a safe reverse demolition construction process.

9 Claims, 5 Drawing Sheets

(56) References Cited

U.S. PATENT DOCUMENTS

| | | | | |
|---|---|---|---|---|
| 5,974,743 | A * | 11/1999 | Vaia | E04H 9/14 |
| | | | | 52/169.1 |
| 9,249,594 | B2 * | 2/2016 | DeStefano | E04H 9/145 |
| 9,644,365 | B1 * | 5/2017 | DeStefano | E04G 23/065 |
| 2002/0007605 | A1 * | 1/2002 | Cohen | E04H 5/02 |
| | | | | 52/261 |
| 2002/0046415 | A1 * | 4/2002 | Albert | C07K 14/00 |
| | | | | 536/23.6 |
| 2014/0259989 | A1 * | 9/2014 | Gregory | E04G 23/065 |
| | | | | 52/741.15 |
| 2021/0189741 | A1 * | 6/2021 | Forrest | E04H 9/14 |
| 2021/0372133 | A1 * | 12/2021 | Hale | E04B 1/355 |

* cited by examiner

CORE-PULLING TRANSFER DEVICE AND CONSTRUCTION METHOD FOR REVERSE DEMOLITION OF REINFORCED CONCRETE STRUCTURES

TECHNICAL FIELD

The disclosure belongs to the field of reverse demolition of house structures and bridge structures, and in particular relates to a core-pulling transfer device and construction method for reverse demolition of reinforced concrete structures.

BACKGROUND

At present, along with the aging of urban reinforced concrete structures, more and more reinforced concrete structures are to be demolished. Traditional demolition methods, such as manual demolition, mechanical demolition and blasting demolition, are serious in dust and noise pollution and difficult to control, and thus are not suitable for structure demolition in urban dense building areas.

Reverse demolition is demolition from the bottom of the building to the top of the building floor by floor, sound insulation plates are erected around a construction floor at the bottom of the structure, original floor slabs of the structure are used for sound insulation above the construction floor, concrete members are separated through wiresaws in demolition, concrete blocks are cut off and conveyed to a designated factory for unified treatment, and therefore noise and dust are almost avoided during demolition operation. Reasonable transfer of vertical load is the key of whether reverse demolition can be carried out smoothly or not, and existing vertical transfer in reverse demolition has the problems of low construction speed, difficult operation, unreasonable transferring and the like.

SUMMARY

Therefore, the disclosure aims to provide a core-pulling transfer device and construction method for reverse demolition of reinforced concrete structures, and the device and method can quickly transfer vertical load of the reinforced concrete structure, smoothly transmit vertical force, and achieve a safe reverse demolition construction process.

In order to achieve the above purpose, the technical solution according to the disclosure is achieved in such a way that:

a core-pulling transfer device for reverse demolition of reinforced concrete structures comprises temporary supports, long-stroke hydraulic jacks and steel crossbeams, wherein the temporary supports are supported on bottom surfaces of bottom crossbeams of the reinforced concrete structure. A hole through beam end is formed in each end, connected with a force-transmitting structure column, of each bottom crossbeam, a margin for connection with the adjacent force-transmitting structure column is reserved at the end of each beam end through hole, two long-stroke hydraulic jacks are symmetrically arranged on both sides of each force-transmitting structure column. The core-pulling holes are formed in upper end sides of demolition floor structure columns, a margin for connection with an upper structural beam is reserved at the top of each core-puling hole, one steel crossbeam is in clearance fit with each core-pulling hole, both ends of each steel crossbeam extend out of the corresponding core-pulling hole, lower surfaces of the long-stroke hydraulic jacks are fixedly connected to a foundation, and upper surfaces of oil cylinders of the long-stroke hydraulic jacks are propped against lower surfaces of the corresponding steel crossbeams after moving up and penetrating through the corresponding beam end through holes.

Furthermore, all of long-stroke hydraulic jacks are connected with electronic numerical control equipment, and the electronic numerical control equipment simultaneously controls all long-stroke hydraulic jacks to move up or down at the same time.

Furthermore, dimensions of each steel crossbeam extended out of the corresponding core-pulling hole are the same.

Furthermore, sections of the steel crossbeams are box-shaped or rectangular, and the width of the sections of the steel crossbeams does not exceed 0.25 time of the side length of the demolition structural columns.

Furthermore, bottoms of the long-stroke hydraulic jacks are fixed to the foundation through high-strength bolts or clamping grooves.

Furthermore, upper surfaces of the oil cylinders of the long-stroke hydraulic jacks and lower surfaces of the steel crossbeams are rough surfaces.

Furthermore, the stroke of the long-stroke hydraulic jacks is matched with the floor height of the reinforced concrete structure.

Furthermore, the steel crossbeams are leveled and tightly plugged into the core-pulling holes through gaskets or wedge-shaped blocks.

Furthermore, the arrangement positions of the steel crossbeams are determined through the height and the stroke of the long-stroke hydraulic jacks.

A construction method for reverse demolition of the reinforced concrete structures by using the above core-pulling transfer device for reverse demolition of the reinforced concrete structures comprises the following steps:

I, selecting the tonnage and the stroke of long-stroke hydraulic jacks according to axial force of structure columns and floor height of the building to be demolited;

II, determining the width of core-pulling holes formed in the demolition floor structure columns and the width of steel crossbeams by check the bearing capacity of local concrete on the top surfaces of the core-pulling holes and the bearing capacity of residual section concrete after the core-pulling holes are formed;

III, determining the height of the steel crossbeams and the height of the core-pulling holes according to the axial force of the demolition floor structure columns and a bending and shearing calculation model of a simply supported beam under the action of concentrated load;

IV, using bottom crossbeams as construction platform beams, and erecting temporary supports at the bottoms of the construction platform beams;

V, forming beam end through holes in the ends of the construction platform beams;

VI, mounting and fixing the long-stroke hydraulic jacks;

VII, forming the core-pulling holes in the demolition floor structure columns, and inserting the steel crossbeams into the core-pulling holes;

VIII, moving the long-stroke hydraulic jacks up to unload internal force of the demolition floor structure columns;

IX, dividing the demolition floor structure columns into blocks from top to bottom, taking out the blocks by adopting chain blocks, and loading the blocks to a truck;

X, after all the demolition floor structure columns on the same floor are taken out, synchronously enabling all the long-stroke hydraulic jacks to fall back;

XI, moving the demolition floor structure columns down to top surfaces of the force-transmitting structure columns, gradually unloading axial force of the jacks, transmitting the axial force to the force-transmitting structure columns through the residual concrete section around the core-pulling holes in the demolition floor structure columns, and thus enabling the force-transmitting structure columns to be stressed again;

XII, cutting and separating upper structure beams and floor slabs falling to a construction platform, and transporting the cut and separated upper structure beams and floor slabs to a designated position; and XIII, repeating the step IV to the step XII until a whole reverse demolition process of the reinforced concrete structure is finished.

Compared with the prior art, the core-pulling transfer device for reverse demolition of the reinforced concrete structures according to by the disclosure has the following advantages:

core-pulling transfer provided by the application is implemented by adopting the temporary supports, the steel crossbeams and the long-stroke hydraulic jacks; the temporary supports support the construction platform, and a machine is controlled on the construction platform to demolish the floor slabs and structure beam members, and the demolition is convenient and rapid; the stroke difference of the long-stroke hydraulic jacks directly reflects the height difference between the long-stroke hydraulic jacks, and thus distribution of jacking force of the long-stroke hydraulic jacks can be adjusted more easily and timely through visual pressure values; the width of the steel crossbeams can be obtained through check calculation of local bearing capacity of the top surfaces of the core-pulling holes and bearing capacity of residual sections after the core-pulling holes are formed, and the height of the steel crossbeams can be obtained through check calculation of a concentrated load model of the simply supported beam, so that the internal force of the columns is reasonably transferred to the steel crossbeams; one floor falls down each time, and thus the construction speed is increased; the steel crossbeams are flexible in arrangement position and suitable for diversified construction site environments; cutting operation and jack equipment are on different floors, so that the construction operation space is increased; for a building structure with a basement, the jack equipment and the temporary supports are erected on a $1^{st}$ underground floor, and a first floor ground serves as the construction platform; the core-pulling holes are formed in the structure beams to carry out core-pulling transfer, and the additional stroke of the long-stroke hydraulic jacks caused by the height of the steel crossbeams can be avoided.

Although investment cost of the long-stroke hydraulic jacks is relatively high in an initial stage, the jacks can be used repeatedly, and if the cost is equally distributed into each reverse demolition project, the reverse demolition cost will be greatly reduced.

BRIEF DESCRIPTION OF FIGURES

Drawings forming a part of the disclosure serve to provide a further understanding of the disclosure, and illustrative examples and descriptions of the disclosure serve to explain the disclosure and do not constitute an undue limitation of the disclosure. In the drawings.

Figure 1:
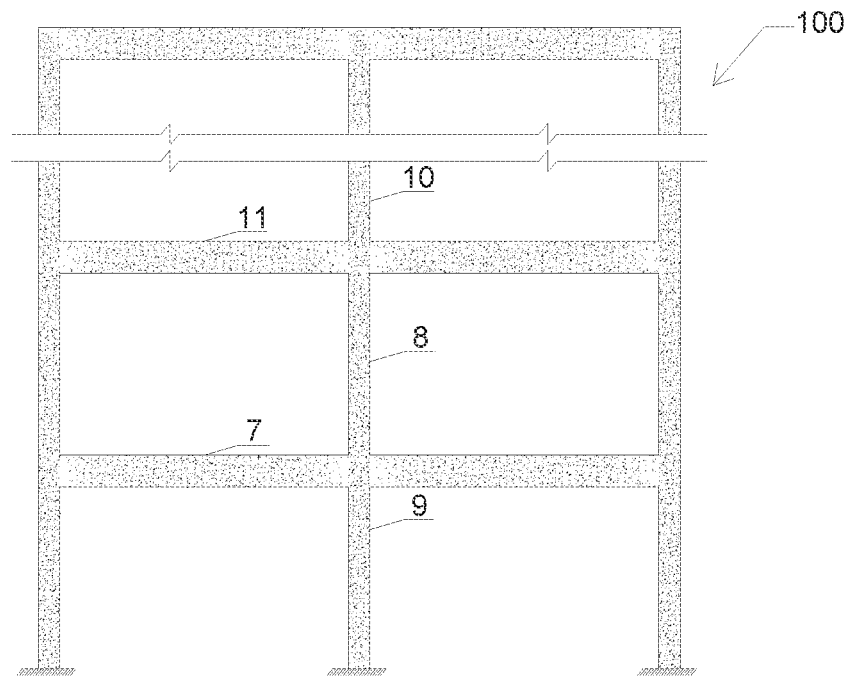
FIG. 1 is a schematic diagram of a structure to be demolished according to the disclosure.
Figure 2:
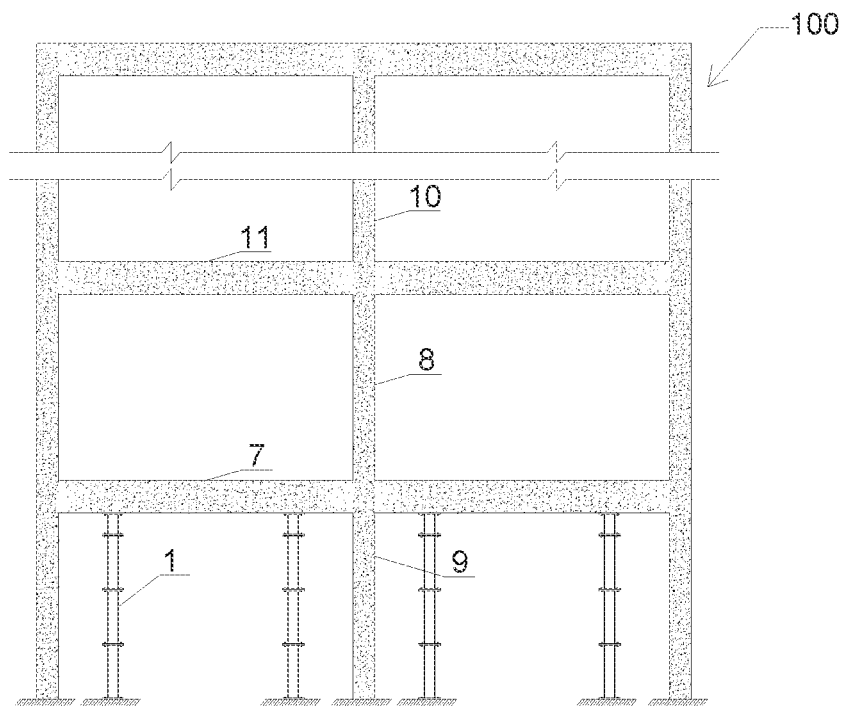
FIG. 2 is a schematic diagram of temporary supports tightly propped against a construction platform beam according to the disclosure.
Figure 3:
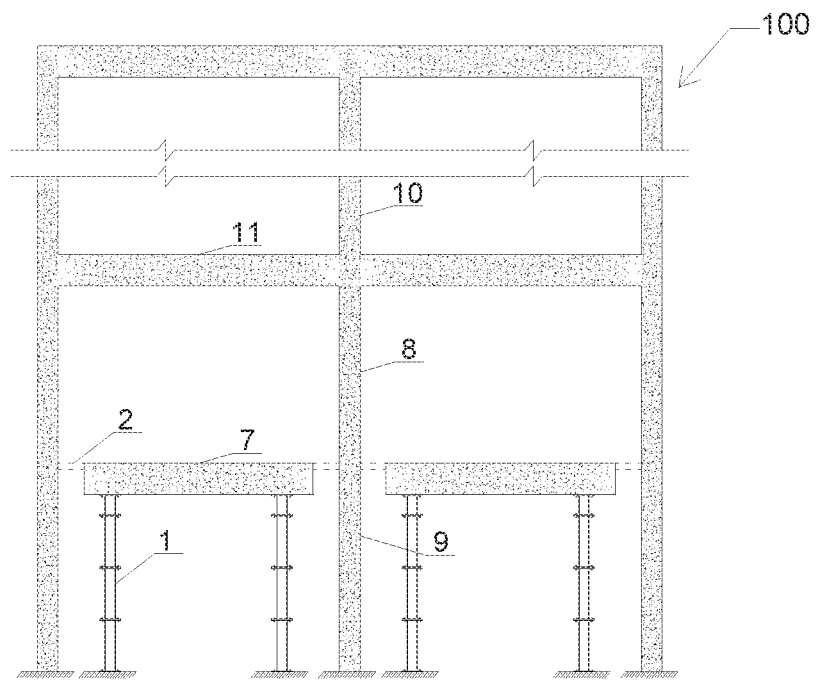
FIG. 3 is a schematic diagram of separation of columns and beam ends and through holes formed in the beam ends according to the disclosure.
Figure 4:
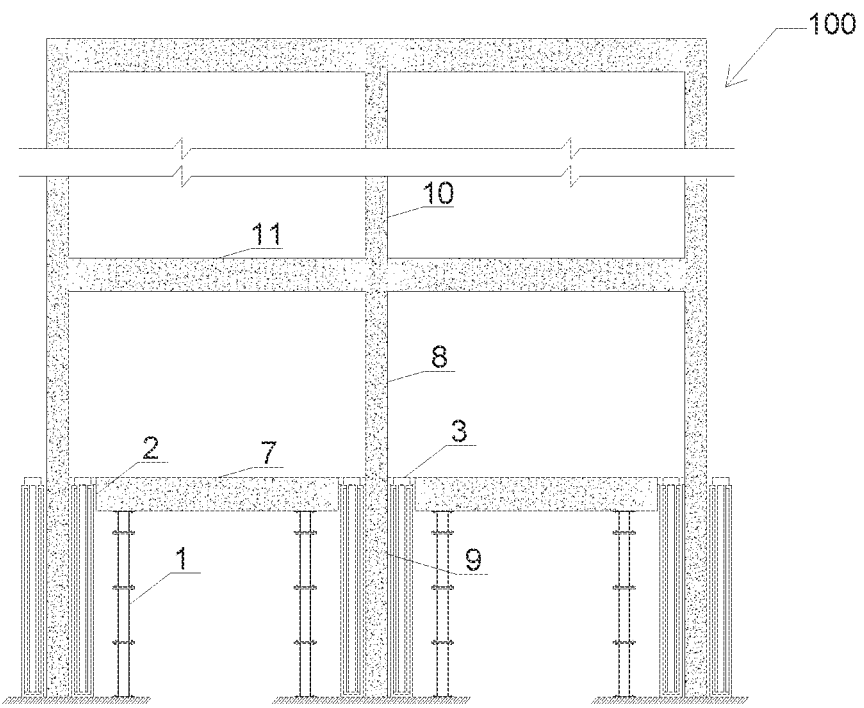
FIG. 4 is a schematic diagram of mounting long-stroke hydraulic jacks according to the disclosure.
Figure 5:
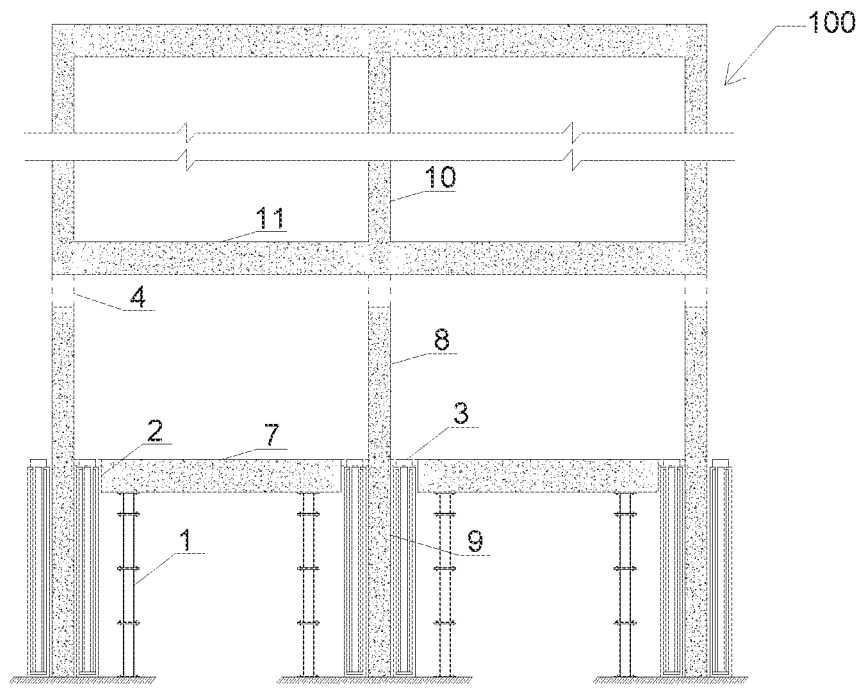
FIG. 5 is a schematic diagram of forming core-pulling holes in the structure columns according to the disclosure.
Figure 6:
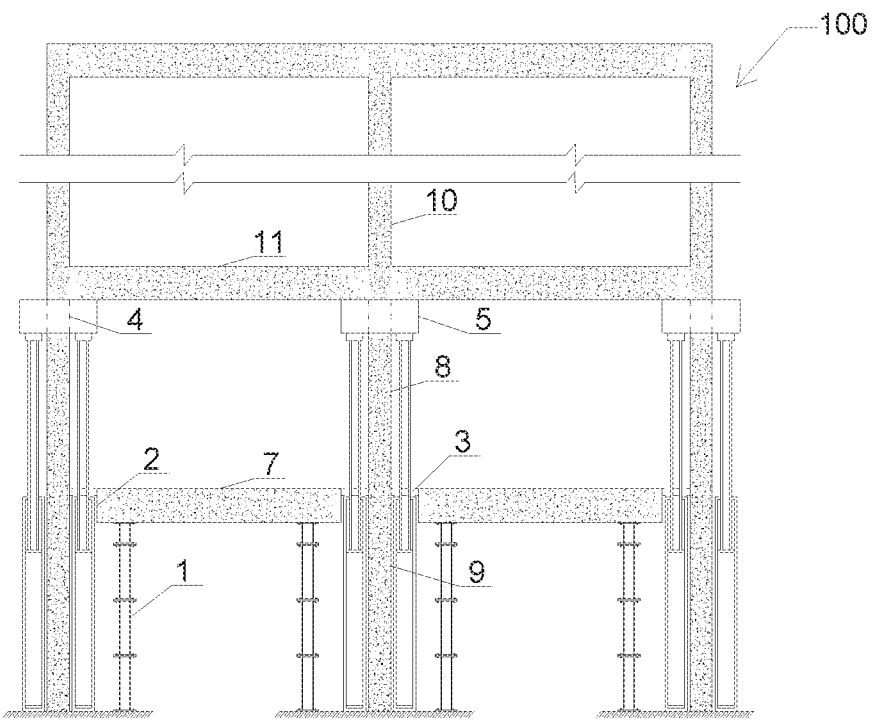
FIG. 6 is a schematic diagram of demolition floor structure columns with steel crossbeams inserted and jacking of the long-stroke hydraulic jacks according to the disclosure.
Figure 7:
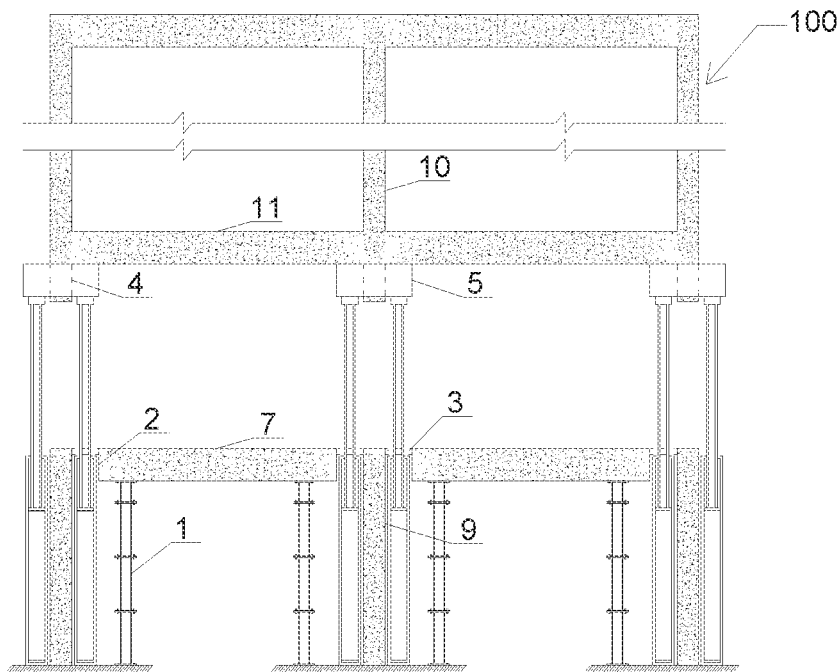
FIG. 7 is a schematic diagram of cutting off and taking out the demolition floor structure columns according to the disclosure.
Figure 8:
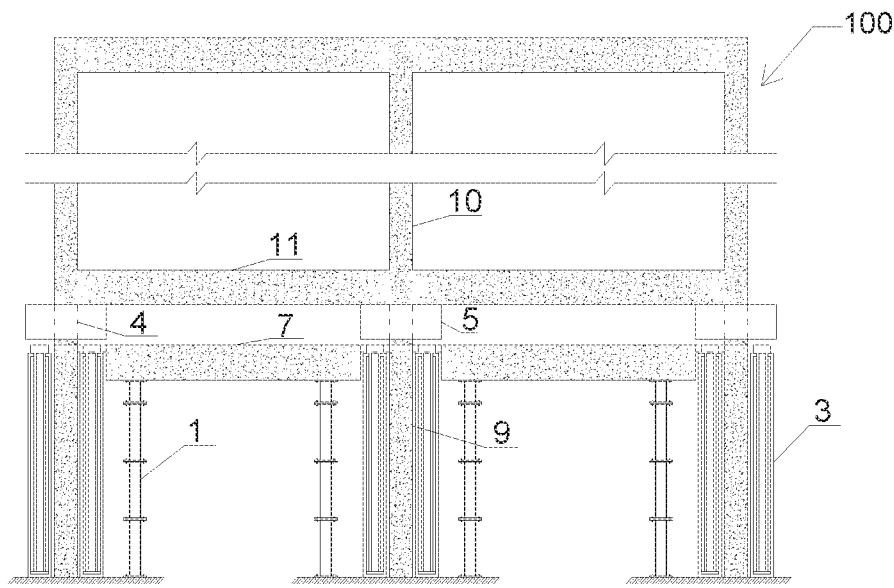
FIG. 8 is a schematic diagram of overall falling of the structure according to the disclosure.
Figure 9:
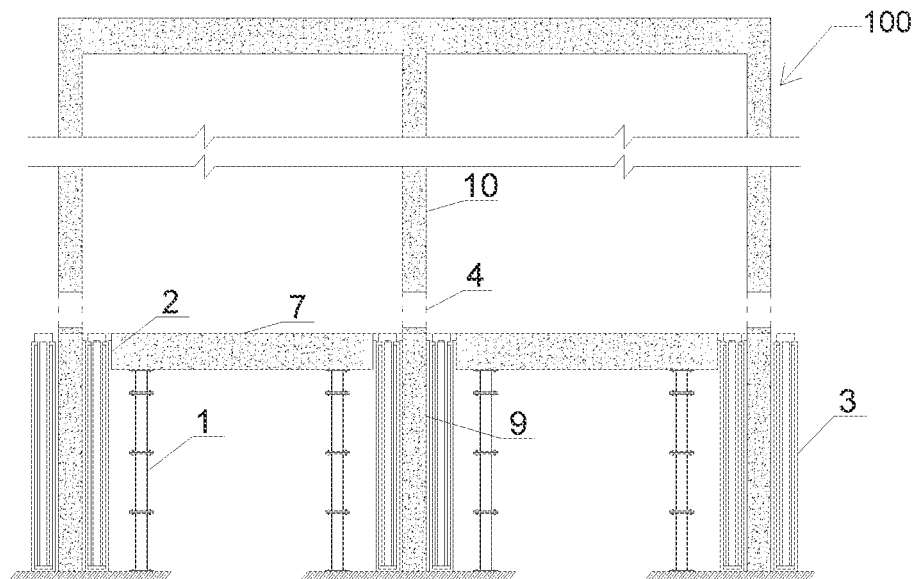
FIG. 9 is a schematic diagram of separation and transportation of upper floor slabs from the beams according to the disclosure.

DESCRIPTION OF REFERENCE NUMERALS IN THE DRAWINGS 1, temporary support; 2, beam end through hole; 3, long-stroke hydraulic jack; 4, core-pulling hole; 5, steel crossbeam; 6, bottom plate; 7, construction platform beam; 8, demolition floor structure column; 9, force-transmitting structure column; 10, upper structure column; and 11, upper structure beam; 100, reinforced concrete structure.

DETAILED DESCRIPTION

It should be noted that, in the case of no conflict, examples of the disclosure and features of the examples can be combined with each other.

The disclosure will be described in detail below with reference to the drawings in conjunction with the examples.

As shown in FIG. 1 to FIG. 9, a core-pulling transfer device for reverse demolition of reinforced concrete structures comprises temporary supports 1, long-stroke hydraulic jacks 3 and steel crossbeams 5, wherein the temporary supports 1 are supported on bottom surfaces of bottom crossbeams, namely construction platform beams 7, of the reinforced concrete structure 100, a beam end through hole 2 is formed in each end, connected with a force-transmitting structure column 9, of each bottom crossbeam, a margin for connection with the adjacent force-transmitting structure column 9 is reserved at the end of each beam end through hole 2, two long-stroke hydraulic jacks 3 are symmetrically arranged on both sides of each force-transmitting structure column 9, core-pulling holes 4 are formed in upper ends of demolition floor structure columns 8, a margin for connection with an upper structure beam 11 is reserved at the top of each core-puling hole 4, one steel crossbeam 5 is in clearance fit with each core-pulling hole 4, both ends of each steel crossbeam 5 extend out of the corresponding core-pulling hole 4, lower surfaces of the long-stroke hydraulic jacks 3 are fixedly connected to a foundation, and upper surfaces of oil cylinders of the long-stroke hydraulic jacks are propped against lower surfaces of the corresponding steel crossbeams 5 after moving up and penetrating through the corresponding beam end through holes 2.

The temporary supports 1 are supported on the bottom surfaces of the construction platform beams 7, for bearing a construction platform and additional construction load. The steel crossbeams 5 are inserted into the demolition floor structure columns 8 in a penetrating mode, tightly plugged into the core-pulling holes 4, and used for transfer internal force of the demolition floor structure columns 8. The long-stroke hydraulic jacks 3 are propped against the lower surfaces of the steel crossbeams 5 or the bottom surfaces of the structure beams 11, and the contact surfaces are rough. The bottom surfaces of the long-stroke hydraulic jacks 3 are fixedly connected to the foundation.

According to the core-pulling transfer device of vertical load, when the reinforced concrete structure 100 is reversely demolished, the internal force of the demolition floor structure columns 8 can be transmitted to the long-stroke hydraulic jacks 3 through the steel crossbeams 5, and the local bearing capacity of top surfaces of the core-pulling holes 4 in the side surfaces of the demolition floor structure columns 8 and the bearing capacity of residual sections of the demolition floor structure columns 8 after the core-pulling holes 4 are formed are fully utilized, so that the internal force of the demolition floor structure columns 8 are reasonably transferred, and construction safety in reverse demolition of the reinforced concrete structure 100 is ensured.

The sections of the temporary supports 1 are independently designed according to partial dead weight of the construction platform and the additional construction load, and the dead weight of other parts of the construction platform is transmitted to the force-transmitting structure columns 9 through the uncut beams.

The electronic numerical control equipment can simultaneously control the plurality of long-stroke hydraulic jacks 3 to move up or fall down at the same time, and also can independently control a certain long-stroke hydraulic jack 3 to move up or fall back independently. The electronic numerical control equipment can control the plurality of long-stroke hydraulic jacks 3 to synchronously move up or fall down under the condition of certain pressure difference and stroke difference of the oil cylinders.

The sections of the steel crossbeams 5 are box-shaped or rectangular. The upper surfaces of the steel crossbeams 5 need to be planes instead of convex surfaces generating horizontal component force to split the structure columns, and the concave surfaces are of tip stress concentration.

In order to ensure forming precision of the core-pulling holes 4, wire saw cutting is recommended in construction. The core-pulling holes 4 are slightly larger than the steel crossbeams 5, and the beam end through holes 2 are slightly larger than the section size of the long-stroke hydraulic jacks 3. The width of the core-pulling holes 4 is determined according to the bearing capacity of the local concrete and the residual section concrete after the core-pulling holes 4 are formed, and the width of the sections is generally not larger than 0.25 time of the side length of the structure columns.

In a demolition process, the stability of the long-stroke hydraulic jacks 3 should be guaranteed; the bottoms of the long-stroke hydraulic jacks 3 need to be fixed to the foundation through high-strength bolts or clamping grooves or the like, the cylinder walls of the long-stroke hydraulic jacks 3 can also be connected with the force-transmitting structure columns 9 or the construction platform beams 7 to increase the number of supporting points, and thus the stability of the long-stroke hydraulic jacks 3 is guaranteed in construction. The perpendicularity of the long-stroke hydraulic jacks 3 needs to be adjusted in construction.

The contact surfaces of the long-stroke hydraulic jacks 3 and the steel crossbeams 5 are rough, so that part of horizontal resistance is provided, and the long-stroke hydraulic jacks and the steel crossbeams are prevented from slipping when accidental events occur.

Extensions of the two ends of each steel crossbeam out of the corresponding core-pulling hole are the same, that is, stress points of the steel crossbeam 5 supported by the two symmetrically-arranged long-stroke hydraulic jacks in the same group are also symmetrically arranged, and the stress points of the steel crossbeam 5 are symmetrical; it is guaranteed that the surface of the stressed concrete on the steel crossbeam 5 is evenly stressed, and an unbalance loading phenomenon is avoided.

Construction problems are complex and diversified, and the positions of the steel crossbeams 5 can be flexibly arranged according to specific on-site conditions.

Due to the long stroke of the oil cylinders of the long-stroke hydraulic jacks 3, the construction speed is increased, and the number of internal force transferring times of the demolition floor structure columns 8 is reduced.

Gaskets are inserted into the core-puling holes 4 for leveling and compensating concrete cutting deviation, and it is ensured that the positions of the steel crossbeams 5 are not changed after the steel crossbeams are mounted in place; and wedge-shaped blocks or the gaskets need to be inserted into the core-pulling holes 4.

According to the core-pulling transfer device of the application, the internal force of the demolition floor structure columns 8 is alternately borne by using the bearing capacity of the residual sections of the demolition floor structure columns 8 and the local compression bearing capacity of the concrete on the top surfaces of the core-pulling holes 4 after the core-pulling holes 4 are formed in the demolition floor structure columns 8. The steel crossbeams 5 penetrate through the core-pulling holes 4, the two long-stroke hydraulic jacks 3 are symmetrically arranged under two overhung ends of each steel crossbeam 5, and the long-stroke hydraulic jacks 3 synchronously move up, so that the steel crossbeams 5 extrude the top surfaces of the core-pulling holes 4, the local compression bearing capacity of the concrete on the top surfaces of the core-pulling holes 4 is fully utilized, and the load is transmitted to the long-stroke hydraulic jacks 3 through the steel crossbeams 5, thus the internal force of the demolition floor structure columns 8 is unloaded, then the demolition floor structure columns 8 are cut off, and the long-stroke hydraulic jack 3 falls back. Reverse demolition of the structure is achieved through reciprocated moving up and falling back operation of the long-stroke hydraulic jacks 3.

A construction method for reverse demolition of the reinforced concrete structures by using the above core-pulling transfer device for reverse demolition comprises the following steps:

I, according to a reverse demolition structure construction drawings and a calculation model, obtaining floor height and axial force of demolition floor structure columns, and further selecting the stroke and the tonnage of long-stroke hydraulic jacks 3, wherein when the stroke of the long-stroke hydraulic jacks 3 is selected, additional height added by a construction scheme should be considered, for example, the height of steel crossbeams 5 needs to be considered for the stroke of the long-stroke hydraulic jacks 3.

II, determining the width of core-pulling holes 4 formed in the demolition floor structure columns 8 and the width of the steel crossbeams 5 by check calculating the bearing capacity of local concrete on top surfaces of the core-pulling holes 4 and the bearing capacity of residual section concrete after the core-pulling holes 4 are formed, wherein the width of the core-pulling holes 4 formed in the demolition floor structure columns 8 is slightly larger than that of the steel crossbeams 5;

III, determining the height of the steel crossbeams 5 and the height of the core-pulling holes 4 according to the axial force of the demolition floor structure columns 8 and a bending and shearing calculation model of a simply supported beam under the action of concentrated load;

IV, erecting temporary supports 1 on the bottoms of construction platform beams 7, and thus providing a construction operation platform (second floor);

V, forming beam end through holes 2 in the ends, on the same side with the steel crossbeams 5, of the construction platform beams 7, and allowing the long-stroke hydraulic jacks 3 to penetrate through the beam end through holes, wherein beams in the other direction are still connected with the force-transmitting structure columns 9, and the beams in the other direction refer to the beams at the same height with the construction platform beams 7 but perpendicular to the construction platform beams 7;

VI, mounting the long-stroke hydraulic jacks 3 and fixing the long-stroke hydraulic jacks to periphery structures to ensure the stability of the long-stroke hydraulic jacks 3 in construction;

VII, forming the core-pulling holes 4 in the demolition floor structure columns 8, and inserting the steel crossbeams 5 into the core-pulling holes;

VIII, moving the long-stroke hydraulic jacks 3 up to unload the internal force borne by the residual sections of the structure columns after the core-pulling holes 4 are formed;

IX, after the internal force of the demolition floor structure columns 8 is unloaded, cutting off the demolition floor structure columns 8 into blocks from top to bottom by adopting cutting tools, taking out the blocks from the demolition floor structure columns 8 by adopting chain blocks, and loading the blocks to a truck;

X, after all the demolition floor structure columns 8 on a same floor are cut off and taken out, synchronously enabling all the long-stroke hydraulic jacks 3 to fall back;

XI, enabling the long-stroke hydraulic jacks 3 to fall back to the initial state, gradually unloading the axial force, transmitting the axial force to the force-transmitting structure columns 9 through the residual concrete section around the core-pulling holes 4, and thus enabling the force-transmitting structure columns 9 to be stressed again;

XII, moving down upper structure beams 11 and floor slabs on the same floor to the construction operation platform (second floor) through falling back of the long-stroke hydraulic jacks 3, separating the upper structure beams and the floor slabs through the cutting tools, and transporting the separated upper structure beams and floor slabs to a designated position; and XIII, repeating the step IV to the step XII, and sequentially demolishing upper structure columns 10 and crossbeams on the upper structure columns until a whole reverse demolition process of the reinforced concrete structure is finished.

The actual construction is complex and diversified, the step IV to the step XII can be flexibly adjusted to meet construction requirements.

Figure 10:
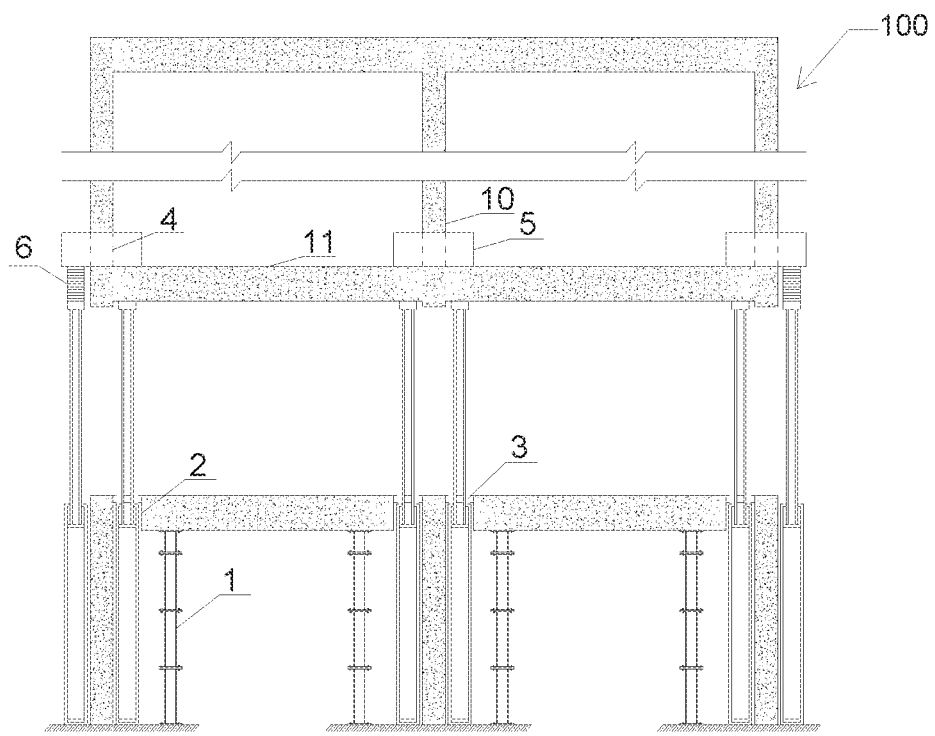
FIG. 10 is a schematic diagram of forming the core-pulling holes in the structure beams to carry out core-pulling transfer according to the disclosure.

FIG. 10 is a second form of core-pulling transfer, embodied as follows: the core-pulling holes 4 are formed in the side surfaces of the upper structure columns 10 on the upper structure beams 11, transfer steps are similar to the transfer steps provided by the disclosure, and only bottom plates 6 need to be additionally arranged before jacking of the long-stroke hydraulic jacks 3. The core-pulling holes 4 are formed in the upper portions of the structure beams 11 to carry out core-pulling transfer, so that construction of the steel crossbeams 5 is facilitated, and a jack stroke reserved for the height of the steel crossbeams 5 does not need to be considered.

The core-pulling holes 4 are formed in the upper portions of the structure beams 11, so that the long-stroke hydraulic jacks 3 are directly propped against the bottom surfaces of the structure beams 11; in practice, members of the structure beams 11 and the demolition floor structure columns 8 are generally different in concrete grade; if the structure beams 11 are supported on the lower surfaces of the structure beams, compressive strength of the structure beams 11 needs to be check calculated, and whether the core-pulling holes 4 can be formed in the side surfaces of the upper structure columns 10 or not is judged by check calculating the compressive strength of the material of the structure beams 11.

The foregoing is merely preferable examples of the disclosure and is not intended to limit the disclosure, and any modifications, equivalent replacements, improvements and the like made within the spirit and principles of the disclosure should be included within the scope of the disclosure.

What is claimed is:

1. A core-pulling transfer device comprising:
   temporary supports,
   long-stroke hydraulic jacks and
   a steel crossbeam;
   wherein the temporary supports are configured to support on a bottom surface of a crossbeam of a reinforced concrete structure,
   wherein ends of the crossbeam of the reinforced concrete structure have beam end through holes,
   wherein the crossbeam of the reinforced concrete structure is connected with a force-transmitting structure column of the reinforced concrete structure,
   wherein the long-stroke hydraulic jacks are configured to be symmetrically arranged on both sides of the force-transmitting structure column,
   wherein the reinforced concrete structure comprises a demolition floor structure column and an upper end of the demolition floor structure column comprises a core-pulling hole,
   wherein the steel crossbeam is configured to in clearance fit through the core-pulling hole, with both ends of the steel crossbeam extending out of the core-pulling hole,
   wherein lower surfaces of the long-stroke hydraulic jacks are configured to be connected to a foundation, and upper surfaces of the long-stroke hydraulic jacks are configured to be propped against a lower surfaces of the steel crossbeam after the long-stroke hydraulic jacks extend through the beam end through holes.

2. The core-pulling transfer device according to the claim 1, wherein extensions of both ends of the steel crossbeam out of the core-pulling hole are the same.

3. The core-pulling transfer device according to the claim 1, wherein sections of the steel crossbeam are box-shaped or rectangular, and wherein a width of the sections of the steel crossbeam does not exceed 0.25 times of a side length of the demolition floor structure column.

4. The core-pulling transfer device according to claim 1, wherein bottoms of the long-stroke hydraulic jacks are fixed to the foundation through bolts or clamping grooves.

5. The core-pulling transfer device according to claim 1, wherein the upper surfaces of the long-stroke hydraulic jacks- and the lower surfaces of the steel crossbeam are textured.

6. The core-pulling transfer device according to claim 1, wherein a stroke of the long-stroke hydraulic jacks matches a floor height of the reinforced concrete structure.

7. The core-pulling transfer device according to the claim 1, wherein the steel crossbeam is leveled and configured to be plugged into the core-pulling hole through gaskets or wedge-shaped blocks.

8. The core-pulling transfer device according to claim 7, wherein arrangement positions of the steel crossbeam are determined through a height and stroke of the long-stroke hydraulic jacks.

9. A method of using the core-pulling transfer device according to claim 1, comprising the following steps:
  selecting a tonnage and a stroke of the long-stroke hydraulic jacks according to axial force of the demolition floor structure column and a floor height;
  determining a width of the core-pulling hole and a width of the steel crossbeam;
  determining a height of the steel crossbeam and a height of the core-pulling holes according to an axial force of the demolition floor structure column and a bending and shearing calculation model of a supported beam under action of concentrated load;
  using the crossbeam of the reinforced concrete structure as a construction platform beam, and erecting the temporary supports at bottoms of the construction platform beams;
  forming the beam end through holes in ends of the construction platform beam;
  mounting and fixing the long-stroke hydraulic jacks;
  forming the core-pulling hole in the demolition floor structure column, and inserting the steel crossbeam into the core-pulling hole;
  moving the long-stroke hydraulic jacks up to unload internal force of the demolition floor structure column;
  dividing the demolition floor structure column into blocks from top to bottom, removing the blocks by adopting chain blocks;
  synchronously causing the long-stroke hydraulic jacks to fall back;
  moving the demolition floor structure column down to top surfaces of the force-transmitting structure column, unloading axial force of the long-stroke hydraulic jacks, transmitting the axial force to the force-transmitting structure column through a residual concrete section around the core-pulling hole in the demolition floor structure column, thereby and thus enabling the force-transmitting structure column to be stressed again;
  cutting and separating upper structure beams and floor slabs falling to a construction platform.

* * * * *